(12) United States Patent
Versavel

(10) Patent No.: US 9,759,182 B2
(45) Date of Patent: Sep. 12, 2017

(54) ROTOR ASSEMBLY FOR A WIND TURBINE

(71) Applicant: JOVAL NV, Kortrijk (BE)

(72) Inventor: Jozef Robrecht Jan Versavel, Kortrijk (BE)

(73) Assignee: JOVAL NV, Kortrijk (BE)

( * ) Notice: Subject to any disclaimer, the term of this patent is extended or adjusted under 35 U.S.C. 154(b) by 371 days.

(21) Appl. No.: 14/428,662

(22) PCT Filed: Sep. 23, 2013

(86) PCT No.: PCT/EP2013/069755
§ 371 (c)(1),
(2) Date: Mar. 17, 2015

(87) PCT Pub. No.: WO2014/044855
PCT Pub. Date: Mar. 27, 2014

(65) Prior Publication Data
US 2015/0233343 A1 Aug. 20, 2015

(30) Foreign Application Priority Data

Sep. 24, 2012 (BE) .................................. 2012/0632

(51) Int. Cl.
*F03D 1/06* (2006.01)
*F03D 9/00* (2016.01)
*F03D 1/00* (2006.01)
*F03D 7/02* (2006.01)

(52) U.S. Cl.
CPC .......... *F03D 1/0625* (2013.01); *F03D 1/006* (2013.01); *F03D 7/0224* (2013.01); *F03D 9/002* (2013.01)

(58) Field of Classification Search
CPC ...... F03D 1/0625; F03D 1/0608; F03D 1/065; F03D 1/0658; F03D 1/0666; F03D 1/06; F03D 1/062; F03D 1/064; F03D 7/0224
See application file for complete search history.

(56) References Cited

U.S. PATENT DOCUMENTS

| 1,532,601 | A | | 4/1925 | Regener | |
|---|---|---|---|---|---|
| 4,316,699 | A | | 2/1982 | Schott et al. | |
| 5,531,567 | A | * | 7/1996 | Hulls | F03D 3/062 |
| | | | | | 416/194 |
| 8,465,256 | B2 | * | 6/2013 | Holmoy | F03D 1/0675 |
| | | | | | 416/141 |
| 2011/0031763 | A1 | * | 2/2011 | Fuglsang | F03D 1/0658 |
| | | | | | 290/55 |
| 2012/0051914 | A1 | * | 3/2012 | Dehlsen | F03D 1/0658 |
| | | | | | 416/147 |

(Continued)

FOREIGN PATENT DOCUMENTS

DE  19606359 A1  8/1997
DE  102015102461 A1 * 9/2015 ........... F03D 1/0666
(Continued)

OTHER PUBLICATIONS

International Search Report for corresponding International PCT Application No. PCT/EP2013/069755, Oct. 24, 2013.

*Primary Examiner* — Craig Kim
*Assistant Examiner* — Wayne A Lambert
(74) *Attorney, Agent, or Firm* — Workman Nydegger

(57) ABSTRACT

The invention relates to a wind turbine, more specifically a rotor assembly for a wind turbine. The rotor assembly comprises blades with an advantageous cable system.

15 Claims, 5 Drawing Sheets

(56) References Cited

U.S. PATENT DOCUMENTS

2016/0069322 A1* 3/2016 Leijnen ................ F03D 1/0666
                                                                            416/147

FOREIGN PATENT DOCUMENTS

| EP | 2112372 A1 | 10/2009 |
| WO | 2008067083 A2 | 6/2008 |
| WO | 2008111841 A2 | 9/2008 |

\* cited by examiner

ROTOR ASSEMBLY FOR A WIND TURBINE

BACKGROUND

The invention relates to a wind turbine, more specifically to a rotor assembly for a wind turbine.

Wind turbines are often used to generate electrical energy by converting the kinetic energy of the wind to electrical energy. A wind turbine comprising a horizontal shaft comprises a tower, a nacelle and a rotor assembly with a plurality of blades. The rotor assembly is mounted in the nacelle by means of a shaft which is directly or indirectly connected to a generator for generating electrical energy.

A known wind turbine is described in WO2008/067083, which discloses a wind turbine with a rotor assembly. Said rotor assembly comprises a central hub with a central rotation axis and a plurality of blades, each of which is attached to the central hub by its first central end and the longitudinal axis of which extends substantially radially with respect to the central rotation axis up to its second radial end. These blades each comprise a spreader which is arranged at the location of an intermediate point situated between the first central end and the second radial end. This spreader cooperates with a cable system which anchors the blade to the central hub via three cables in order thus to reinforce the blade structure. However, in order to anchor the cables to the central hub, an auxiliary wheel is required, whose important function is to provide a wider base for the attachment points for the cables in order to reduce the forces which are generated in the cables. In particular, the forces which are generated in the cables as a result of the deformation of the blade transversely to the central rotation axis.

Another wind turbine comprising a rotor with blades having a spreader and a cable system is known from WO2008/111841. In order to widen the base for the cables which have to absorb deformation transversely to the rotation axis, these cables are attached to the nearby blades. However, in this way, this deformation is absorbed less efficiently, since the supporting effect of these cables is nullified upon similar deformation of all the blades. Furthermore, the cable system is supplemented by a structure with rods which extend from the spreader to the central hub and which also have to absorb pressure forces, thus limiting their length. This limits the distance from the spreader to the central rotation axis.

Yet another such wind turbine is known from DE19606359; this mechanism is only able to absorb deformation of the blade along the central rotation axis. In addition, this also uses a rod mechanism, thus limiting their length and therefore limiting the distance from the spreader to the rotation axis.

As a result thereof, there is a need for a rotor assembly for a wind turbine which overcomes the abovementioned drawbacks and more particularly a rotor assembly for a wind turbine comprising blades with an improved cable system so that the blades can offer more resistance to the load to which they are subjected and can be made in a simpler manner and more lightweight.

SUMMARY

According to a first aspect of the invention, a rotor assembly for a wind turbine is provided comprising,
a central hub with a central rotation axis; and
a plurality of blades, each of which is attached to the central hub by its first central end and the longitudinal axis of which extends substantially radially with respect to the central rotation axis up to its second radial end; these blades each comprising:
a spreader which is arranged at the location of an intermediate point situated between the first central end and the second radial end; and
a cable system which cooperates with the blade and the central hub,
Characterized in That
the central hub comprises at least three first attachment points;
the blade comprises at least three corresponding second attachment points at the location of the second radial end;
the spreader comprises at least three corresponding third attachment points;
the blade comprises at least three corresponding fourth attachment points at the location of the intermediate point, wherein the distance from the longitudinal axis of the blade to the second and fourth attachment points is smaller than to the first and third attachment points; and
the cable system comprising:
a first cable system which comprises at least three corresponding cables which respectively connect the first attachment points to the corresponding fourth attachment points; and
a second cable system which comprises at least three corresponding cables which respectively connect the first attachment points to the corresponding second attachment points via the corresponding third attachment points.

The rotor assembly according to the invention makes it possible to limit the base for attachment of the cables of the first cable system on the central hub, because they are attached at the location of the spreader and close to the longitudinal axis of the blade. Additional structures for attachment of the cables are no longer necessary. In addition, this can be achieved by means of blades of a simple and lightweight structure.

According to an embodiment, the first attachment points and the corresponding third attachment points for each blade are arranged in such a manner that:
at least one attachment point is situated on either side of the plane covered by the longitudinal axis L of the blades; and
at least one attachment point is situated on either side of the plane formed by the longitudinal axis of the blade and the central axis.

The rotor assembly according to the invention is also able to absorb the deformation of the blades in the plane which is covered by the longitudinal axis of the blades more efficiently since these forces occur directly via the cables of the first cable system which are attached near the longitudinal axis of the blade and not at the ends of the arms of the spreader, thus reducing the load on the spreader.

According to a further embodiment, the distance to the longitudinal axis of the first attachment points substantially corresponds to that of the corresponding third attachment points.

According to yet a further embodiment, the first attachment points are arranged such that they substantially correspond to a projection of the at least three third attachment points along the longitudinal axis of the blade.

According to a preferred embodiment, the blade comprises a first central blade part which extends from the first central end to an intermediate point; and a second radial blade part which is attached to the first central blade part and extends from the intermediate point to the second radial end.

The spreader can also be positioned closer to the radial end of the blade, which makes it possible to maximize a surface which is covered by the radial blade part. In addition, this offers the possibility of limiting the maximum length of the components of the rotor assembly, which is advantageous during transportation.

Preferably, only the second radial blade part comprises a wing which has a shape such that it is suitable to be driven by the wind.

According to an embodiment, the wing is produced as an extruded profile.

In this way, the rotor assembly according to the invention can make use of a wing which can be produced in a simple manner.

According to an embodiment, the first central blade part comprises a tube.

According to a further embodiment, the second radial blade part comprises a tube which is fittable to the tube of the first central blade part at the location of the intermediate point and to which the wing is attached.

According to yet a further embodiment, the wing is rotatably mounted to the tube of the second radial blade part.

According to an embodiment, the wing, along the longitudinal axis of the blade, comprises an internal cavity into which the tube of the second radial blade part is introduceable.

This makes it possible to produce the rotor assembly using simple components.

Preferably, the blade comprises a positioning mechanism and a control device which is coupled thereto and which, upon activation, is configured to adjust the position of the wing; and the wing is formed and/or fitted in such a way that the wing turns out of the wind upon deactivation of the control device.

According to an embodiment, the positioning mechanism and the control device coupled thereto are configured such that they turn the wing out of the wind when a predetermined speed of rotation of the rotor assembly is reached.

This makes it possible to protect the rotor assembly against overload.

According to an embodiment, the positioning mechanism comprises a hydraulic actuator and the control device which is coupled thereto comprises a hydraulic circuit.

According to a further embodiment, the positioning mechanism and/or the control device coupled thereto are fitted in the rotor assembly, the control device further comprising:

an energy supply which is configured to be charged by means of an electric generator which is fitted to the rotor assembly or by a stationary energy source by means of wireless transfer of energy; and/or a wireless communication module configured to make wireless communication possible between the control device and a stationary control device.

This makes it possible to fit and actuate the actuators of the rotor assembly in a simple manner without complicated mechanical transmissions.

BRIEF DESCRIPTION OF THE DRAWINGS

The invention will now be described in more detail with reference to the drawings, in which.

DETAILED DESCRIPTION OF VARIOUS EMBODIMENTS

Figure 1:
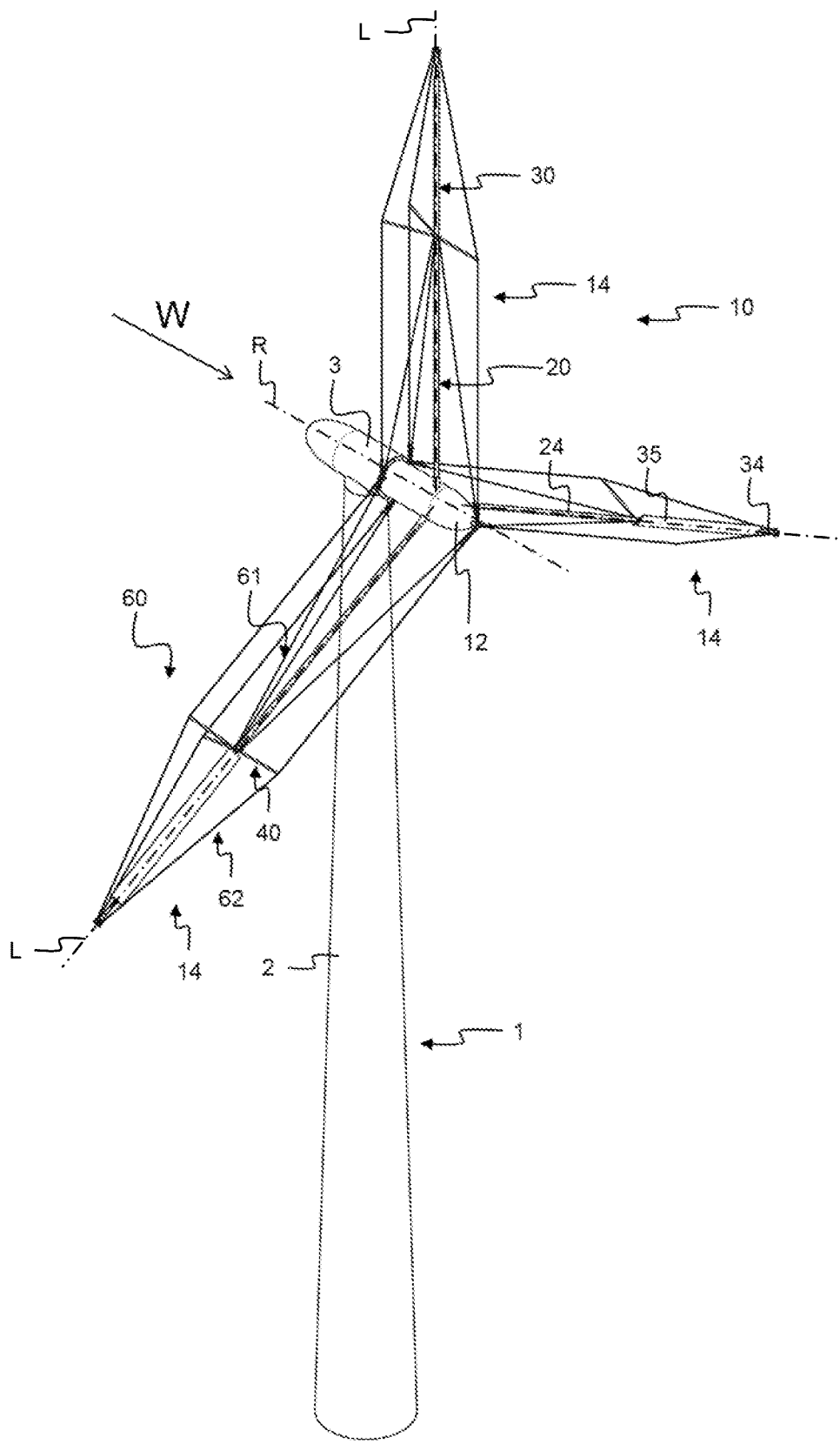
FIG. 1 shows an embodiment of a wind turbine according to the invention.

FIG. 1 shows an embodiment comprising a wind turbine 1 with a rotor assembly 10 according to the invention. It encompasses a horizontal axis wind turbine 1 with a nacelle 3 which is rotatably fitted so as to be rotatable about a vertical rotation axis on a tower 2. The rotor assembly 10 itself is rotatably fitted in the nacelle in order to rotate about a substantially horizontal central rotation axis R. The rotor assembly 10 is arranged "downwind", which means on the rear side of the nacelle 3 during operation, according to the wind direction W. Such an arrangement offers the advantage that no additional mechanism is required to keep the rotor assembly 10 in the wind. According to an alternative embodiment, the rotor assembly 10 can also be arranged "upwind", for example in order to prevent the disadvantageous effects of turbulence at the rear of the tower, but this requires an additional mechanism in order to keep the rotor assembly in the wind, such as, for example, a weather blade or a wind sensor in combination with a servomotor.

The rotor assembly 10 is rotatable about a substantially central horizontal rotation axis R and comprises a central hub 12, the central shaft of which coincides with the central horizontal rotation axis R. Three blades 14 are attached to this central hub. It is clear that, according to alternative embodiments, a different multiple number of blades may be fitted, such as for example two, four, five, etc. The blades 14 are attached to the central hub 12 by means of their first central ends 22 and extend substantially radially with respect to the central rotation axis R along their longitudinal axis L to their second radial end 32.

Figure 2:
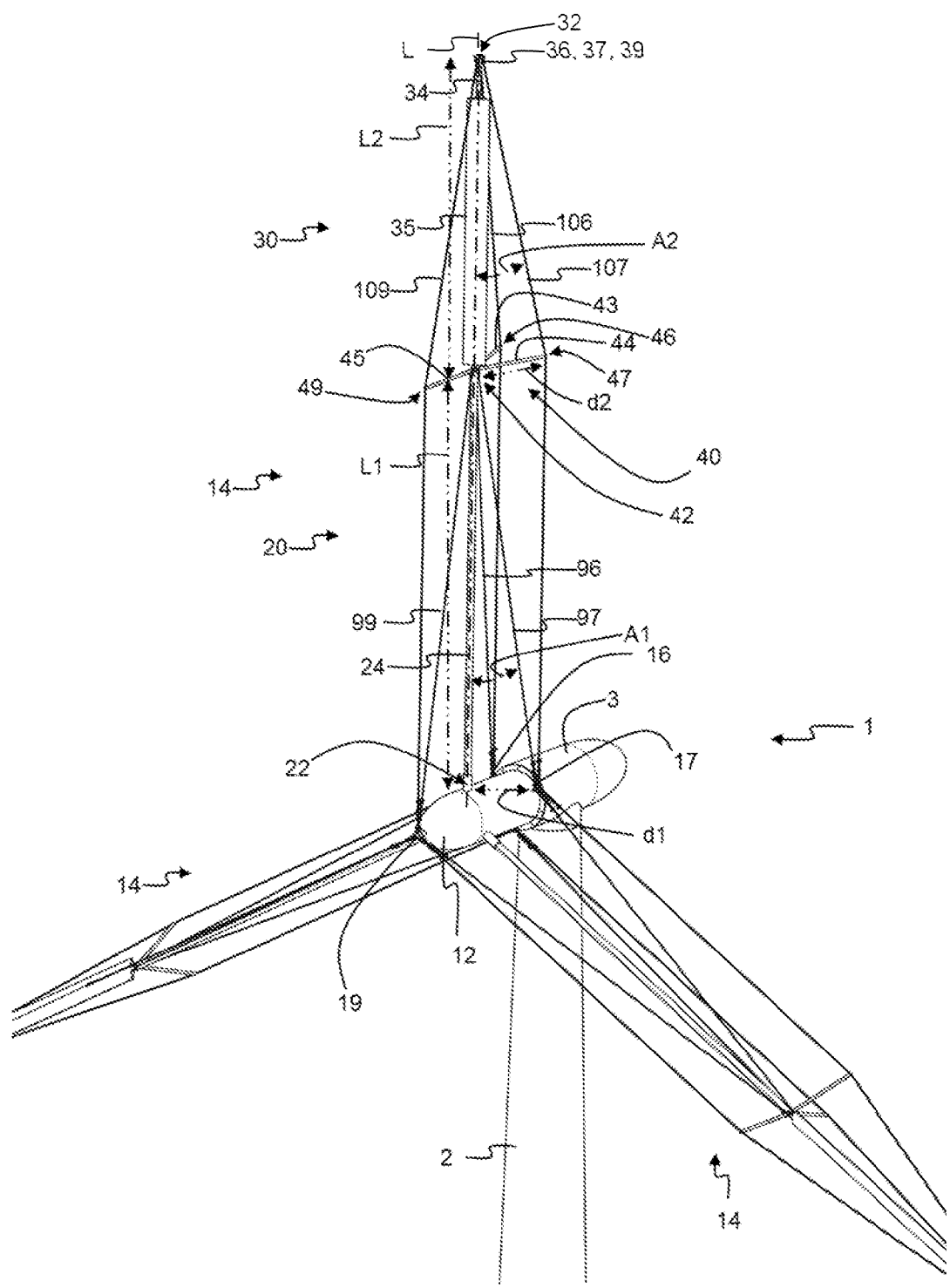
FIGS. 2 and 3 show a partial illustration of the rotor assembly of the wind turbine from FIG. 1.
Figure 3:
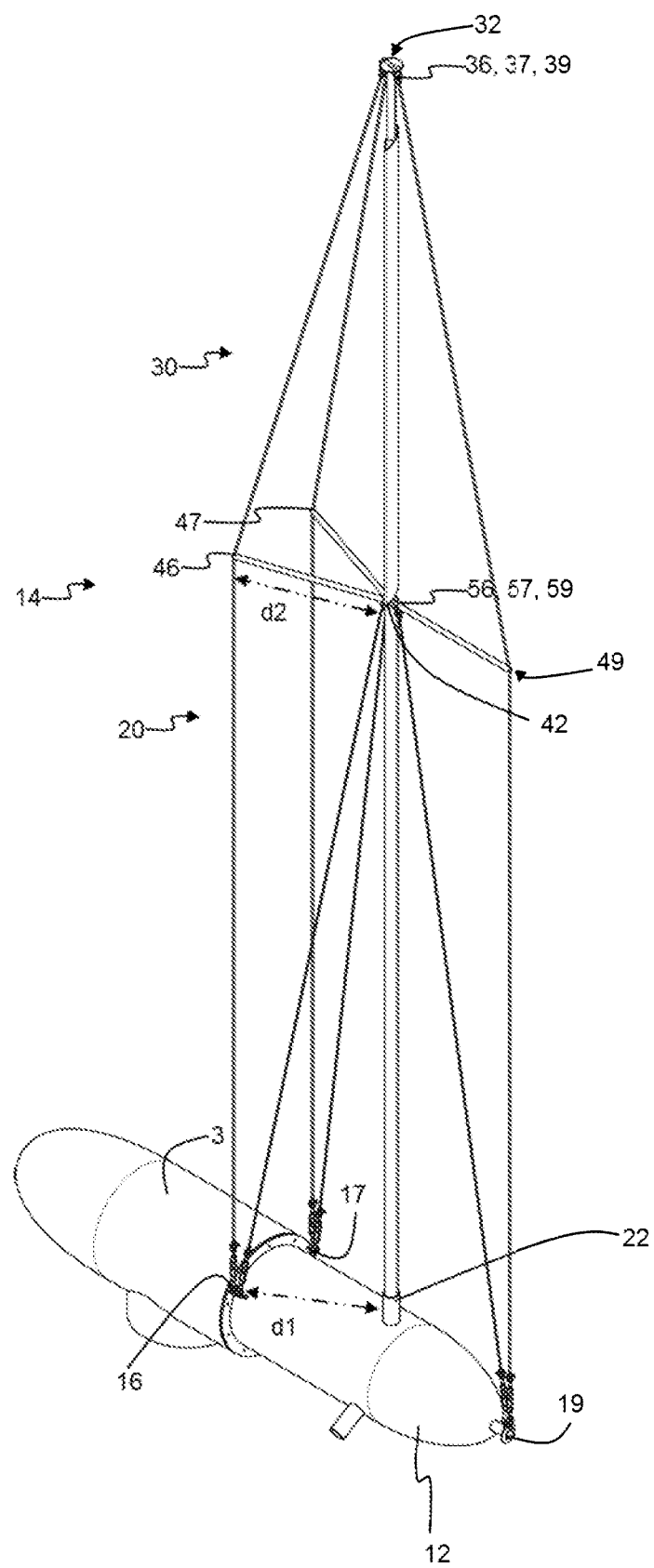

As is illustrated in FIG. 1 and also in more detail in FIGS. 2 and 3, each of said blades 14 comprises a spreader 40 which is fitted at the location of an intermediate point situated between the first central end 22 and the second radial end 32. In addition, these blades 14 also each comprise a cable system 60 which cooperates with the blade 14 and the central hub 12. This cable system 60 ensures that deformation of the blade 14 is prevented. It encompasses both deformation through load on the blades along the direction of the central rotation axis R, and deformation of the blades 14 at right angles to the central rotation axis R. To this end, the cable system 60 comprises a first cable system 61 and a second cable system 62 having at least three cables which cooperate with different attachment points in order thus to prevent deformation of the blades 14 in these two directions. As is described below in more detail, the attachment points for two of these three cables, namely the two cables which are fitted "upwind", are formed on either side of the plane by the longitudinal axis L of the blade 14 and the central axis R. These two cables have been fitted "upwind" and the third cable has been fitted "downwind", that is to say on either side of the plane covered by the longitudinal axis L of the blades 14.

The blade 14 is divided into two blade parts, that is to say that the blade 14 comprises a first central blade part 20 which extends from the first central end 22 to the intermediate point 42. To this first central blade part 20, which according to this embodiment is configured as a tube 24, a second radial blade part 30 is then attached. This radial blade part 30 extends from the intermediate point 42 to the second radial end 32. As can be seen, according to this embodiment this second radial blade part 30 consists of a tube 34 which is attached to the tube 24 of the first central blade part 20 at the location of the intermediate point 42. A wing 35 which is shaped such that it can be driven by the wind is fitted around this tube 34 of the radial blade part 30. This wing 35 may be fixedly attached to this tube 34, but according to a preferred embodiment, this wing 35 is rotatably mounted on this tube 34 so that it can be turned to different positions by means of an actuator 72, as will be discussed below with reference to FIGS. 4A-C. Separating the blade 14 into two parts is advantageous because in this way the blade 14 can be more readily transported in this disassembled state. In addition, this also makes it possible to produce the wing 35 using a profile which is easy to produce, for example an aluminum or plastic extruded profile. An embodiment of such a profile for the wing 35 is illustrated, for example, in FIGS. 4A-C, in which the wing 35 comprises an internal cavity 38 along the longitudinal axis L of the blade 14 into which the tube 34 of the second radial blade part 30 can be introduced.

The first cable system 61 comprises three cables 96, 97, 99 which are fitted between three attachment points 16, 17, 19 on the central hub 12 and three attachment points 56, 57, 59 on the blade 14 at the location of the intermediate point 42. The attachment points 16, 17, 19 are arranged at a distance d1 to the longitudinal axis L of the blade 14. As is illustrated in FIG. 2, the attachment points 56, 57, 59 are arranged on the tube 24 of the central blade part 20 at the location of the spreader 40. According to a variant embodiment, the attachment points can also be arranged in a similar manner near the longitudinal axis L, for example on the spreader 40 or on the tube 34 of the radial blade part 30. In this case, it is important that the distance to the longitudinal axis L of the blade 14 of the attachment points 56, 57, 59 is smaller than the distance d1 of the longitudinal axis L to corresponding attachment points 16, 17, 19. In this way, these cables 96, 97, 98 are fitted to form an angle A1. The smaller this angle A1, the greater the forces which will develop in the cables 96, 97, 98 due to the loads on the blade 14 transversely to the longitudinal axis L. Such loads may be caused as a result of the load of the wind on the blades 14, but also, for example, as a result of the own weight thereof, even in the unloaded state. As the attachment points 56, 57, 59 are arranged as closely as possible to the longitudinal axis L, the angle A1 is largely determined by the distance d1 of the attachment point 16, 17, 19 to the longitudinal axis L and the length L1 of the central blade part 20. The distance d1 is limited by the dimensions of the central hub 12, and by the minimum distance which has to be kept between the cables and the tower 2. By limiting the distance L1, that is to say by fitting the cables 96, 97, 99 at the location of the intermediate point 42, the angle A1 can be kept sufficiently large without requiring aids to increase the distance d1 at the location of the central hub 12. As can furthermore be seen in FIG. 2, the cables at the location of the attachment points 16, 17, 19 are provided with known cable tensioners in order to be able to adjust the tension of the cables 96, 97, 99 in such a manner that the desired stiffness can be imparted to the central blade part 20, without complicated profiles being required for the tube 24 or materials having a very high stiffness. The tube 24 may, for example, be made from a suitable metal, such as for example steel or aluminum. In this way, it is possible to ensure a simple and lightweight construction of this central blade part 20.

The second cable system 62 comprises three cables 106, 107 and 109 which are fitted between the attachment points 16, 17, 19 on the central hub 12 and corresponding attachment points 36, 37, 39 which are arranged at the location of the radial end 32 of the blade 14. In order to also maximize the angle A2 between the cables 106, 107 and 109 and the longitudinal axis L of the blade 14, the cables 106, 107, 109 at the location of the radial end 32 are fitted as closely as possible to the longitudinal axis L, for example on the tube 34, and guided via corresponding attachment points 46, 47, 49 on the ends of the corresponding arms 43, 44, 45 of the spreader 40. These attachment points 43, 44, 45 on the ends of the spreader arms 43, 44, 45 are fitted at a distance d2 with respect to the longitudinal axis L. In this case as well, the distance d2 has to be selected to be as large as possible, and the limitation of the minimum distance to be respected between the cables 106, 107, 109 of the second cable system 62 and the tower 2 applies in the same way as it does for the distance d1. In addition, it is advantageous to also use the same attachment points 16, 17, 19 for the cables 106, 107, 109 on the central hub 12 as for the cables 96, 97, 99 of the first cable system 61. In this case, as is illustrated for the embodiment in FIGS. 1 to 3, the distance d1 to the longitudinal axis L of the attachment points 16, 17, 19 on the central hub 12 substantially corresponds to the distance d2 of the corresponding attachment points 46, 47, 49 on the ends of the arms 43, 44, 45 from the spreader 40. In addition, according to this embodiment, the cables 106, 107, 109 run substantially parallel to the longitudinal axis L of the blade 14 between the attachment points 16, 17, 19 on the central hub 12 and the attachment points 46, 47, 49 on the ends of the arms 43, 44, 45 of the spreader 40, as a result of which the respective attachment points 16, 17, 19 substantially correspond to a projection of the corresponding attachment points 46, 47, 49 along the longitudinal axis L of the blade 14. Due to the attachment points near the radial end 32 of the blade 14, the second cable system 62 can also increase the stiffness of the radial blade part 30 and, due to the action of the spreader 40, it can reduce the load in the cables 106, 107, 109 by a factor of three to four. In this case as well, the angle A2 is kept sufficiently large by limiting the length L2 of the radial blade part 30, that is to say by arranging the attachment points 46, 47, 49 on the ends of the spreader arms 43, 44, 45 at the location of the intermediate point 42, even if the cables 106, 107, 109 are guided up to the radial end 32 of the blade 14. As can be seen in FIG. 2, these cables 106, 107, 109 are also provided with known cable tensioners at the location of the attachment points 16, 17, 19 in order to be able to adjust the tension in the cables 106, 107, 109 so that the desired stiffness can be imparted to the radial blade part 30 without complicated profiles or materials of very high stiffness being required for the tube 34. The tube 34 can then, in a way similar to that for the tube 24, for example be made from a suitable metal, such as for example steel or aluminum, which also makes a simple and lightweight construction of this radial blade part 30 possible.

As can be seen in FIGS. 1-3, only the radial blade part 30 is provided with a wing 35. Although it is possible, according to a variant embodiment, to also provide a wing on the central blade part 20, this will often result in a more complicated shape of the wing, in particular near the central hub 12. In addition, the power which is generated by the rotor assembly 10 is proportional to the surface which is covered by the wings of the blades 14 and a rotor assembly 10 as illustrated in FIGS. 1-3 may, due to the fact that the wings 35 with readily producible wings 35 are arranged at a certain distance from the central hub 12, for a certain wing length L2 a larger surface may be covered if this distance increases. As a result thereof, it is desirable to be able to choose the distance L1 to the intermediate point 42 to be sufficiently large. In addition, it is also advantageous for transportation of the rotor assembly 12 if the length L2 of the radial blade part 30 and the length L1 of the central blade part 20 remain within certain legal limits. Thus, the length L1 and L2 may be, for example, approximately 6 or 12 meters, so that they can be transported by means of standard containers. Upon installation, both blade parts can then be connected to each other by means of suitable attachment members, such as for example bolts or a clamping connection at the location of the intermediate point 42.

In the exemplary embodiment of FIGS. 1-3, the first cable system 61 and the second cable system 62 in each case comprise three cables, whose attachment points 16, 17, 18 to the central hub 12 and the corresponding attachment points 46, 47, 49 to the ends of the spreader arms 43, 44, 45 are arranged such that they impart stability with respect to all the loads on the blade 14 transversely to the longitudinal axis L. To this end, the attachment points 16, 17; 46, 47 and the attachment point 19; 49 are situated on either side of the plane covered by the longitudinal axis L of the blades 14 to absorb loads substantially along the direction of the rotation axis. In this case, two attachment points 16, 17; 46, 47 are provided on the "upwind" side because the load is greatest on this side during normal operation and can consequently be distributed over the two corresponding cables 96, 97; 106, 107 on this side. Furthermore, the attachment point 16; 106 and the attachment point 17; 107 are situated on either side of the plane formed by the longitudinal axis L of the blade 14 and the central axis R, which makes it possible to also absorb the loads transversely to the wind direction in an optimum manner. The cable system 60 comprising three cables as described above is optimal with regard to minimizing additional air resistance of the rotor assembly. According to variant embodiments of the rotor assembly 10, it is for example also possible to fit four, five or more cables in order to further distribute the load across the cables or to provide redundancy in case a cable breaks.

If the wing 35 is fitted in a fixed position, for example fixed on the tube 34, then the components of the blade 14 have to be dimensioned in such a manner that they can withstand the highest possible load which can be caused by the wind. In order to reduce the maximum load on the components of the blade 14 and consequently to be able to produce a more lightweight and simpler construction, it is preferred to attach the wing 35 on the tube 34 of the second radial blade part 30 so as to be rotatable. In this way, the wing 35 can be turned out of the wind in case of impending overload, that is to say can be turned to a position about the longitudinal axis L of the blade 14 where the impact of the wind is minimal. For the embodiment illustrated in FIGS. 1-3, the wing 35 along the longitudinal axis L of the blade 14 is to this end provided with an internal cavity 38 into which the tube 34 of the second radial blade part 30 can be introduced, and to which the wing 35 can be rotatably attached by means of a suitable bearing.

Figure 4A:
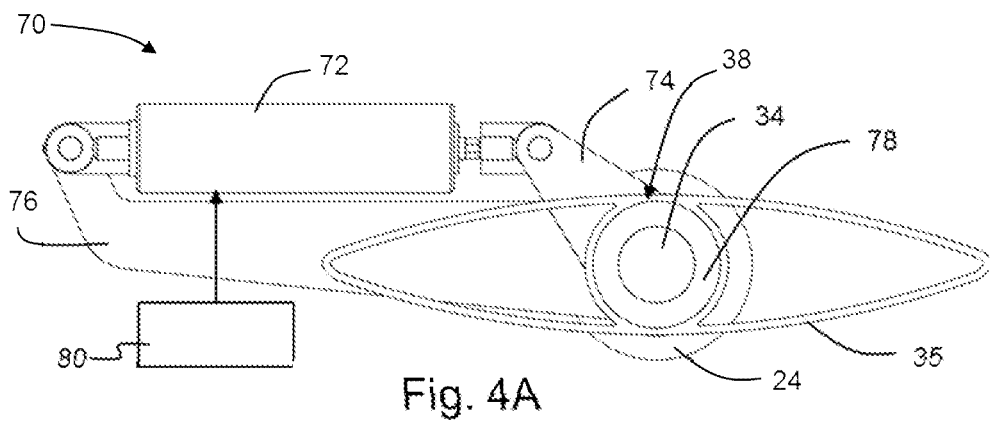
FIGS. 4A-C and 5 show an embodiment of a positioning mechanism for the blades.
Figure 4B:
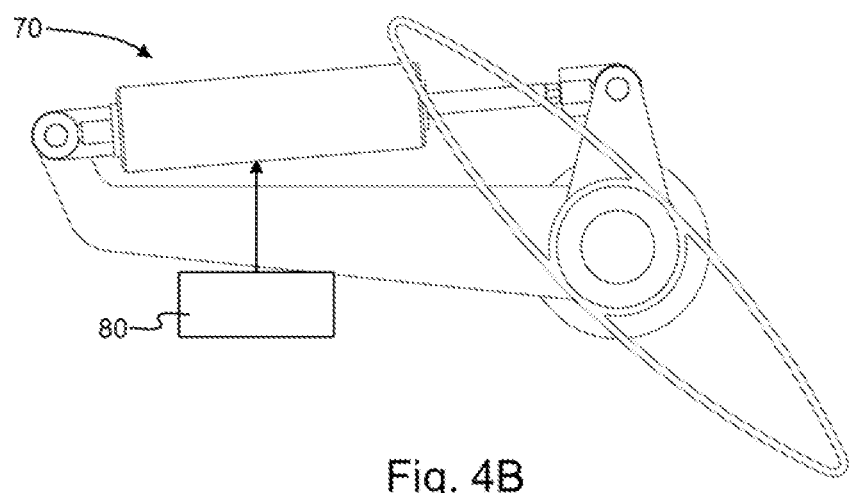
Figure 4C:
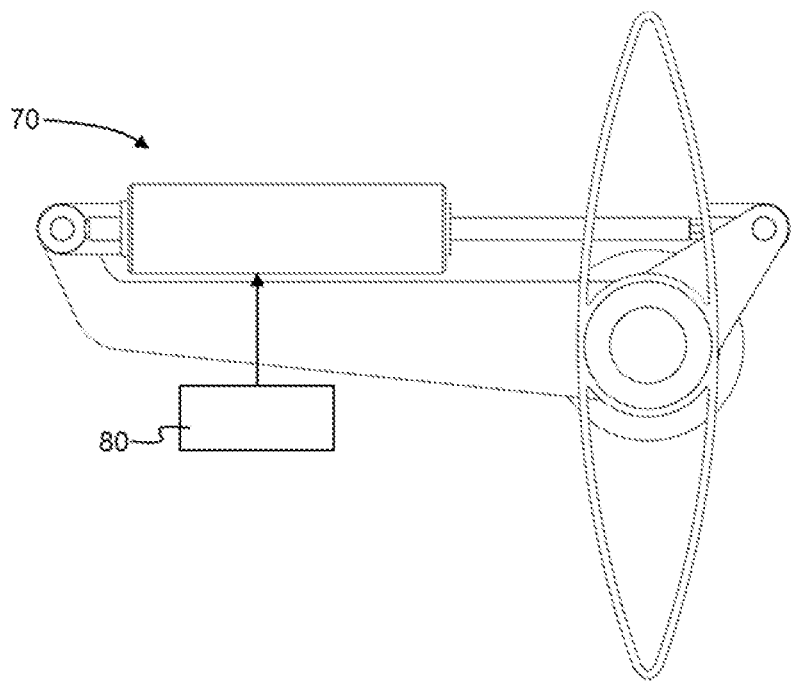

An embodiment of a positioning mechanism 70 and a control device 80 coupled thereto is diagrammatically illustrated in FIGS. 4A-C. The positioning mechanism 70 is configured as a hydraulic actuator 72, for example a single-acting hydraulic actuator 72 with built-in return spring, but according to alternative embodiments this may also be an electric, pneumatic or any other suitable type of actuator. On one side, the hydraulic actuator 72 is connected to the tube 34 of the radial blade part 30 via an arm 76, which may, for example, coincide with the arm 45 of the spreader 40. On the other side, the actuator 72 is connected to the wing 35 via an arm 74. The actuator 72 is thus able to determine the position of the wing 35 which is fitted to the tube 34 of the radial blade part 30 so as to be rotatable by means of a bearing 78.

FIG. 4B shows the wing 35 in its starting position. In this position, the wind has a sufficiently great impact on the wing 35 to generate sufficient torque to be able to set the rotor assembly 10 in motion from a standstill. In this case, the wing 35 is at a well-defined angle of incidence with respect to the relative wind direction. This angle of incidence of the wind direction ensures that a starting torque is generated which is as large as possible. Once the rotor assembly 10 has been brought up to speed from standstill, the actuator 72 can be actuated by the control device 80 in such a manner that the wing 35 is moved to the position illustrated in FIG. 4A. In this position, the wing is placed substantially transversely to the wind direction in order to thus find a better balance between the force generated by the wind on the wing and the air resistance which the wing 35 experiences during rotation of the rotor assembly 10 during normal operation of the wind turbine 1. Finally, FIG. 4C shows the wing 35 in a position which is assumed upon deactivation of the wind turbine, for example in order to prevent overloading at excessive wind speeds or for maintenance purposes. In this position, the wing 35 is substantially aligned with the wind direction, so that the torque generated by the rotor assembly 10 is reduced. In order to ensure safe operation of the rotor assembly 10, the wing 35 is shaped in such a way that, or is provided with means, such as springs, actuators or other elements which ensure that, upon deactivation of the control device 80, the wing 35 is turned out of the wind, so that they assume the position as illustrated in FIG. 4C. In case a predetermined speed of rotation of the rotor assembly 10 is exceeded, which may for example be determined by means of a suitable angular rotation sensor or by means of elements which are actuated by a centrifugal force, the wing 35 is also turned to the position illustrated in FIG. 4C in order to prevent overloading of the rotor assembly 10.

Figure 5:
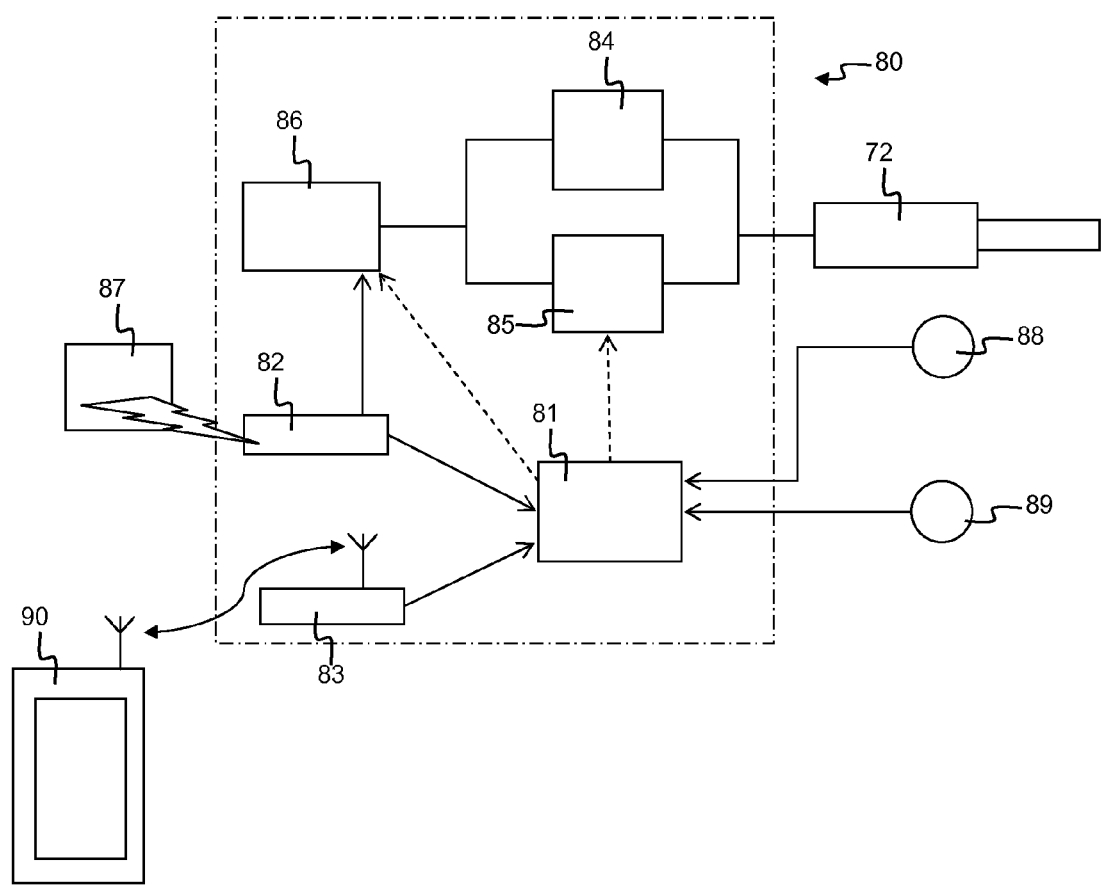

FIG. 5 shows an embodiment of a control device 80 for the actuator 72 illustrated in FIGS. 4A-C. This control device 80 comprises, for example, a hydraulic circuit 84, 85, 86 with hydraulic components, optionally supplemented by an electronic processing unit 81 and suitable energy supplies and/or energy sources 82, 86. Furthermore, the control device is coupled to suitable sensors 88, 89 in order, for example, to determine the speed of rotation of the rotor assembly 10 or the position of the wings 35. The hydraulic circuit 84, 85, 86 is actuated in such a way by the electronic processing unit 81 that the position of the actuator 72 is controlled depending on the speed of rotation of the rotor assembly 10 or on the basis of settings by an operator, for example to make it possible to carry out maintenance on the wind turbine 1. To this end, the hydraulic circuit comprises a suitable energy source 86 with a supply of hydraulic liquid, such as a hydraulic pressure vessel or an accumulator combined with, for example, a suitable hydraulic pomp which is able to supply the hydraulic liquid to or discharge it from the actuator 72. Furthermore, the hydraulic circuit comprises, for example, a centrifugal valve 84 which, depending on the speed of rotation of the rotor assembly 10, actuates the actuator 72 when the maximum permissible speed of rotation is exceeded to deactivate the wings 35 by moving them to the position illustrated in FIG. 4C. In addition, the hydraulic circuit also comprises an electrically actuated valve 85. This valve 85 is actuated in such a manner that hydraulic liquid is supplied to or discharged from the actuator 72, so that the actuator 72 moves the wing 35 into the desired position or keeps it in the desired position. The valve 35 is actuated by an electronic processing unit 81 which, for example, will automatically determine the correct position of the actuator 72 by means of valve 85, on the basis of the data from sensors, such as for example an angular rotation sensor 88 which detects the position of the wing 35 and an angular rotation sensor 89 which records the speed of rotation of the rotor assembly 10. As mentioned above, the electronic processing unit 81 may also be actuated by means of instructions from an operator, for example to deactivate the wings 35 so that the rotor assembly 10 can easily be brought to a standstill in order to facilitate maintenance operations. The electronic processing unit 81 is provided with current from an electrical energy supply 82, such as for example a suitable battery or a capacitor. This electrical energy supply 82 may in turn supply energy to the hydraulic energy source 86, for example to the hydraulic pomp.

Preferably, not only the positioning mechanism 70, but also the control device 80 which is coupled thereto is arranged in the rotor assembly 10. This means that all the necessary means for the operation of the positioning mechanism 70 are also fitted to the rotor assembly 10, for example in the wing 35 or on the blade 14 or in the central hub 12. In this case, the electrical energy supply 82 will rotate along with the rotor assembly 10. In order to charge this energy supply 82, it is then possible, for example, to use wireless energy transfer. This may, for example, be implemented, as is illustrated in FIG. 5, by means of an inductive coupling between the electrical energy supply 82 which is fitted on the rotor assembly 10 and a stationary electrical energy source 87, for example an inductive battery charging station which is arranged in the nacelle 3 or in the tower 2. According to an alternative embodiment, the energy supply 82 can be charged by means of a dynamo or alternator or another suitable electric generator which is also fitted in the rotor assembly. The electric generator is arranged in the rotor assembly in such a manner that the rotation of the rotor assembly 10 is converted into a rotation of the electric generator in order to thus generate electrical energy which can be added to the electrical energy supply 82. This may, for example, be achieved by fitting the stator of the electric generator in the rotor assembly 10 and by coupling the rotor of the electric generator to the nacelle 3, so that, during the rotation of the rotor assembly 10, the rotor of the electric generator rotates with respect to its stator which moves concomitantly with the rotor assembly 10. In order to enable communication between the control device 80 which is present in the rotor assembly 10 and other control devices 90 which are fitted in a stationary manner, for example a control device of the wind turbine which is present in the tower 2 or the nacelle 3 or a service terminal for use by an operator, known systems for wireless data communication can be used. To this end, the control device 80 which is arranged in the rotor assembly comprises a wireless communication module 83, for example a wifi, mobile, bluetooth or other suitable module which enables wireless communication with a stationary control device 90. In this way, all elements to ensure optimum functioning of the rotor assembly 10 are arranged on the rotor assembly 10 itself and can be operated without complicated couplings for cables for energy transfer or communication between the rotor assembly 10 and the nacelle 3 or the tower 2 of the wind turbine 1.

According to a variant embodiment, a third blade part can be added to the rotor assembly 10 according to the invention, at the far end of the blade 14. In this case, a second spreader 40 is then also fitted between the second blade part and the third blade part for a third cable system which is guided to the radial end of the blade which is now formed by the radial end of the third blade part. In a similar way, it is also possible to still provide a fourth, fifth or further blade part.

Obviously, the invention is not limited to the embodiments which have been described by way of example and illustrated in the drawings, but also comprises all alternatives and combinations which fall within the scope of protection of the claims.

The invention claimed is:

1. A rotor assembly for a wind turbine comprising,
a central hub with a central rotation axis; and
a plurality of blades, each of which is attached to the central hub by a first central end and a longitudinal axis of which extends substantially radially with respect to the central rotation axis up to a second radial end; these blades each comprising:
a spreader which is arranged at a location of an intermediate point situated between the first central end and the second radial end; and
a cable system which cooperates with the blade and the central hub,
wherein
the central hub comprises at least three first attachment points;
the blade comprises at least three corresponding second attachment points at a location of the second radial end;
the spreader comprises at least three corresponding third attachment points;
the blade comprises at least three corresponding fourth attachment points at the location of the intermediate point, wherein a distance from a longitudinal axis of the blade to the second and fourth attachment points is smaller than to the first and third attachment points; and
the cable system comprising:
a first cable system which comprises at least three corresponding cables which respectively connect the first attachment points to the corresponding fourth attachment points; and
a second cable system which comprises at least three corresponding cables which respectively connect the first attachment points to the corresponding second attachment points via the corresponding third attachment points.

2. The device as claimed in claim 1, wherein the first attachment points and the corresponding third attachment points for each blade are arranged in such a manner that:
at least one attachment point is situated on either side of the plane covered by the longitudinal axis of the blades; and
at least one attachment point is situated on either side of the plane formed by the longitudinal axis of the blade and the central axis.

3. The device as claimed in claim 1, wherein the distance to the longitudinal axis of the first attachment points substantially corresponds to that of the corresponding third attachment points.

4. The device as claimed in claim 1, wherein the first attachment points are arranged such that they substantially correspond to a projection of the at least three third attachment points along the longitudinal axis of the blade.

5. The device as claimed in claim 1, wherein the blade comprises a first central blade part which extends from the first central end to the intermediate point; and comprises a second radial blade part which is attached to the first central blade part and extends from the intermediate point to the second radial end.

6. The device as claimed in claim 5, wherein only the second radial blade part comprises a wing which has a shape such that it is arranged to be driven by the wind.

7. The device as claimed in claim 6, wherein the wing is produced as an extruded profile.

8. The device as claimed in claim 6, wherein the first central blade part comprises a tube.

9. The device as claimed in claim 8, wherein the second radial blade part comprises a tube, which is fittable to the tube of the first central blade part at the location of the intermediate point, and to which the wing is attached.

10. The device as claimed in claim 9, wherein the wing is rotatably mounted to the tube of the second radial blade part.

11. The device as claimed in claim 10, wherein the wing, along the longitudinal axis of the blade, comprises an internal cavity into which the tube of the second radial blade part is introduceable.

12. The device as claimed in claim 10, wherein the blade comprises a positioning mechanism and a control device which is coupled thereto and which, upon activation, is configured to adjust the position of the wing; and in that the wing is formed and/or fitted in such a way that the wing turns out of the wind upon deactivation of the control device.

13. The device as claimed in claim 12, wherein the positioning mechanism and the control device coupled thereto are configured such that they turn the wing out of the wind when a predetermined speed of rotation of the rotor assembly is exceeded.

14. The device as claimed in claim 12, wherein the positioning mechanism comprises a hydraulic actuator and in that the control device coupled thereto comprises a hydraulic circuit.

15. The device as claimed in claim 10, wherein a positioning mechanism and/or a control device coupled thereto are fitted in the rotor assembly, the control device further comprising:

an energy supply which is configured to be charged by means of an electric generator which is fitted to the rotor assembly or by a stationary energy source by means of wireless transfer of energy; and/or a wireless communication module configured to make wireless communication possible between the control device and a stationary control device.

\* \* \* \* \*